United States Patent [19]

Bonomi et al.

[11] Patent Number: 5,442,624
[45] Date of Patent: Aug. 15, 1995

[54] DYNAMIC ACCESS CONTROL FOR AN ATM NETWORK

[75] Inventors: Flavio G. Bonomi, Rumson; Richard J. Peck, Jackson, both of N.J.

[73] Assignee: AT&T Corp., Murray Hill, N.J.

[21] Appl. No.: 145,426

[22] Filed: Oct. 29, 1993

[51] Int. Cl.$^6$ ............................................. H04J 3/22
[52] U.S. Cl. ........................................ 370/17; 370/84; 370/94.1
[58] Field of Search ............... 370/13, 14, 15, 16, 370/17, 54, 60, 60.1, 85.6, 85.7, 85.8, 94.1, 94.2, 95.1, 95.2, 110.1, 79, 84, 118; 340/825.5, 825.51, 825.52; 371/32, 33

[56] References Cited

U.S. PATENT DOCUMENTS

| | | | |
|---|---|---|---|
| 4,799,215 | 1/1989 | Suzuki | 370/60 |
| 4,839,891 | 6/1989 | Kobayashi et al. | 370/94.1 |
| 4,939,724 | 7/1990 | Ebersole | 370/94.1 |
| 4,999,829 | 3/1991 | Fite, Jr. et al. | 370/16 |
| 5,016,243 | 5/1991 | Fite, Jr. | 370/16 |
| 5,042,029 | 8/1991 | Hayakawa | 370/13 |
| 5,090,011 | 2/1992 | Fukuta et al. | 370/60 |
| 5,115,429 | 5/1992 | Hluchyj et al. | 370/84 |
| 5,128,932 | 7/1992 | Li | 370/60 |
| 5,130,978 | 7/1992 | Mobasser | 370/60 |

*Primary Examiner*—Alpus Hsu
*Attorney, Agent, or Firm*—Frederick B. Luludis

[57] ABSTRACT

A facility is provided in an ATM network to track whether data traffic from a source is being admitted into the network in accord with associated traffic parameters, which control such admission and dynamically change based on the level of congestion along an associated connection carrying such data. Such level of congestion is determined by launching a particular type of cell over the connection and waiting to see if the destination point of the connection and intermediate points thereof return the cell to the sender, thereby indicating that the route of the connection is not congested. If the cell is not returned, then the facility concludes that the route is congested.

22 Claims, 3 Drawing Sheets

DYNAMIC ACCESS CONTROL FOR AN ATM NETWORK

TECHNICAL FIELD

The invention relates to Asynchronous Transport Mode (ATM) networks.

BACKGROUND OF THE INVENTION

The minimum level of bandwidth that a user needs to transmit data over an ATM network is typically negotiated with an ATM network administrator before the user transmits the data over the network. As a result of such negotiations, the level of bandwidth (access) that is awarded to the user is typically defined by a number of different traffic parameters, such as peak and average transmission rates. The network thereafter provides at least the level of access defined by the agreed-to parameters. In doing so the network "polices" the level of bandwidth that the user accesses during the transmission of data to ensure that the user's transmission of data conforms with the agreed-to parameters.

What this means is that the network admits only that level of traffic which conforms with the traffic parameters expected by the network. If the user transmits data at a level which does not conform with the expected parameters agreed to by the user, then the network may not admit the data into the network.

The prior art typically implements such policing using a so-called "leaky bucket" algorithm. That is, the network monitors the interval between successive ATM cells that it is receiving from the user and determines if the interval conforms with the expected associated traffic parameters. If an interval is found to be nonconforming, then the network may discard the incoming cell(s).

One problem in the way that the leaky bucket algorithm is used to police access to an ATM network is that the traffic parameters supplied to the algorithm are fixed for a particular user, which causes the algorithm to restrict the user to a particular level of bandwidth. Disadvantageously, then, the user cannot take advantage of bandwidth that becomes available along a route of a connection established for the user. It is likely then, that as a result of such restriction, the available bandwidth will remain idle until it is used by another user who accesses the ATM network.

SUMMARY OF THE INVENTION

We have recognized that once such traffic parameters are set then they should be allowed to adapt to the level of congestion detected along the route of the connection carrying the user's data traffic, thereby achieving an advancement in the art. Congestion along a route of connection may be detected, in accord with an aspect of the invention, by launching a cell containing a particular identifier over the connection, and, if the cell is returned—which indicates that the route is not congested—then adapting such parameters to allow an increase in the level of data that is being admitted for transmission over the connection. If the cell is not returned—which indicates that the route is congested—then adapting the parameters to decrease such admission. In accord with another aspect of the invention, the source of the data that is being transmitted over the connection is notified of such congestion so that the source may adjust its transmission of data accordingly.

Other aspects of the invention will be appreciated from the ensuing detailed description.

DETAILED DESCRIPTION

Figure 1:
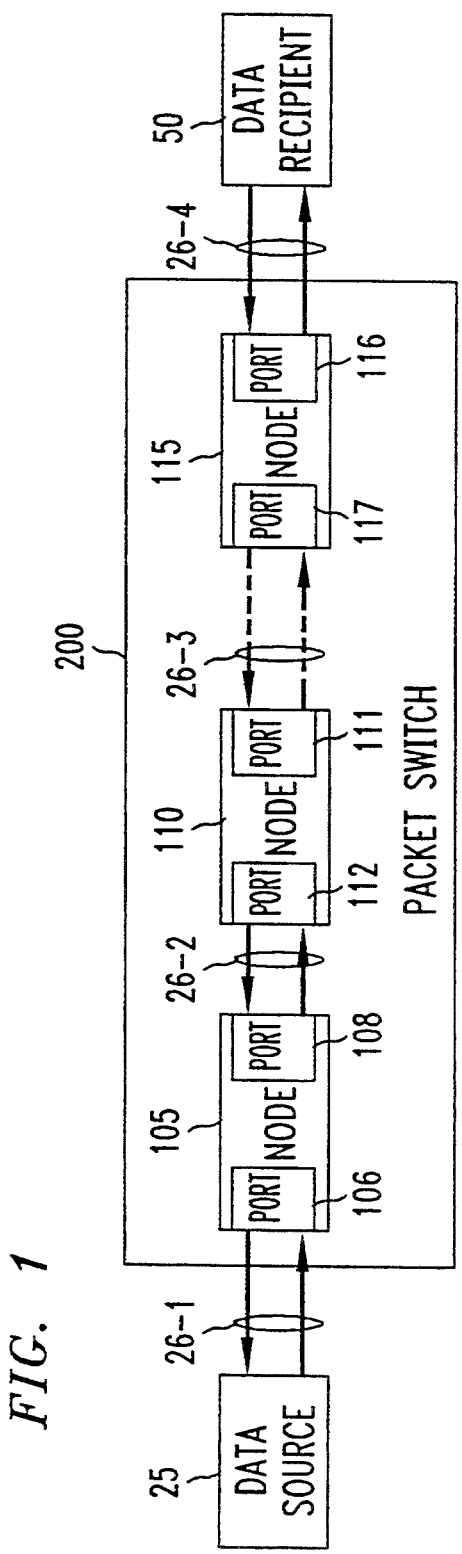
FIG. 1 is a broad block diagram of an ATM network in which the principles of the invention may be practiced.

Turning now to FIG. 1, Asynchronous Transfer Mode (ATM) network 200 comprises a plurality of ATM switches, or nodes, three of which are shown in the FIG., namely nodes 105, 110 and 115. Each such node, e.g., nodes 105 and 115, serves a plurality of users, e.g., data source 25 and recipient 50, respectively. In practice, a data source (or recipient) may be a particular type of equipment, i.e., a computer or another network, and may transmit different types of data, such as video, computer data, etc, which is forwarded to an intended recipient via a respective network 200 connection. In an illustrative embodiment of the invention, such a connection may be a conventional virtual connection which is established between a source and recipient when it is needed and may be a bidirectional connection, as shown in the FIG. for connection 26.

Specifically, when: virtual connection 26 is first established between source 25 and recipient 50 via network 200, the level of traffic that source 25 may transmit over the connection is controlled by a set of priorly negotiated traffic parameters that are stored in port 106 of node 105. Port 106 uses such parameters to "police" the admission of data traffic that it receives from source 25. Such policing includes, in accord with an aspect of the invention, (a) monitoring the rate at which data is received from source 25, (b) determining the level of congestion along connection 26, (c) adapting the values of at least one of the aforementioned parameters as a function of the level of such congestion and (d) sending information characterizing such congestion to the source, as will be discussed below.

Figure 2:
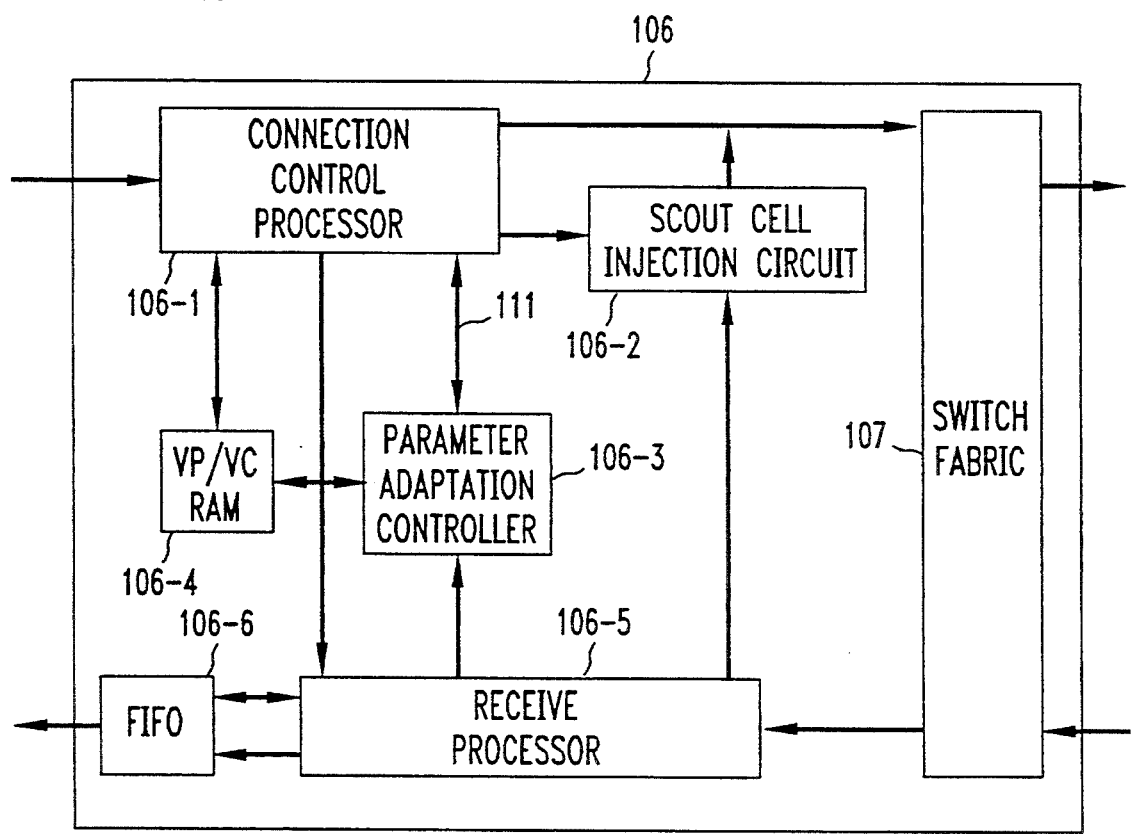
FIG. 2 is a broad block diagram of a port circuit of FIG. 1.

Turning now to FIG. 2, there is shown a broad block diagram of port 106. Port 106 includes connection control processor 106-1, scout cell injection circuit 106-2, and parameter adaptation controller 106-3. Connection control processor 106-1, more particularly, implements a number of different functions including (a) translating connection information contained in the header of a received cell to identify the intended destination of the cell, (b) determining (policing), for each virtual connection associated with source 25, whether data cells are being received at a rate which conforms with the traffic parameters negotiated for the particular virtual connection and (c) performing a number of measurements relating to a particular virtual connection, which measurements are not pertinent to the instant invention and, therefore, will not be discussed herein.

Processor 106-1 uses information contained in a Virtual Path/Virtual Channel (VP/VC) table that is stored in RAM 106-4 to perform such translation and policing. The VP/VC table contains a record for each of the aforementioned virtual connections, in which a record includes, inter alia, translation information relating the associated virtual connection with an output port, e.g., port 108 (FIG. 1). A record also includes the traffic parameters negotiated for the associated virtual connection. As mentioned above, such traffic parameters define the negotiated peak and/or average rates for the admission of data cells received over the associated virtual connection, in which the peak rate and/or average rate may change dynamically, in accord with an aspect of the invention, based on the level of congestion along the route of the connection, as will be discussed below.

Processor 106-1 performs such policing using a conventional "leaky bucket" algorithm, such as the algorithm disclosed in the standard document CCITT I.371, Geneva, July, 1993, which is hereby incorporated by reference. Briefly, the parameters that are used in the leaky bucket standard to police the rate of admission of cells received via an associated virtual connection are stored in a VP/VC record. The parameters are a cell rate R and tolerance ($\tau$), in which the latter parameter is commonly referred to as a cell delay variation tolerance. The current value of R may be the negotiated rate, or minimum rate, or some other higher rate that obtains as a result of dynamically changing R as a function of the level of congestion along the route of the associated virtual connection. The leaky bucket algorithm reads those parameters out of the VP/VC table upon receipt of a cell that is to be transmitted over the associated virtual connection and then uses the parameters in accord with the aforementioned "leaky bucket" algorithm to determine if the data rate at which the cell is received complies with the parameters obtained from the associated record. If not, then processor 106-1 may discard the received cell. Otherwise, processor 106-1 forwards the cell to its intended destination via switch fabric 107.

The level of such congestion is determined, in accord with an aspect of the invention, by transmitting periodically what we call a "scout cell" over the particular virtual connection that is being accessed by source 25. The period, or interval, between the transmission of scout cells over a respective virtual connection is provisionable for the particular virtual connection. (It is noted that controller 106-1 generates a respective scout cell for each virtual connection that is active, i.e., data cells are being transmitted over the connection. It is also noted that a discussion of the generation and transmission of a scout cell over one virtual connection, e.g., connection 26, equally pertains to other active virtual connections processed by controller 106-1.)

Figure 3:
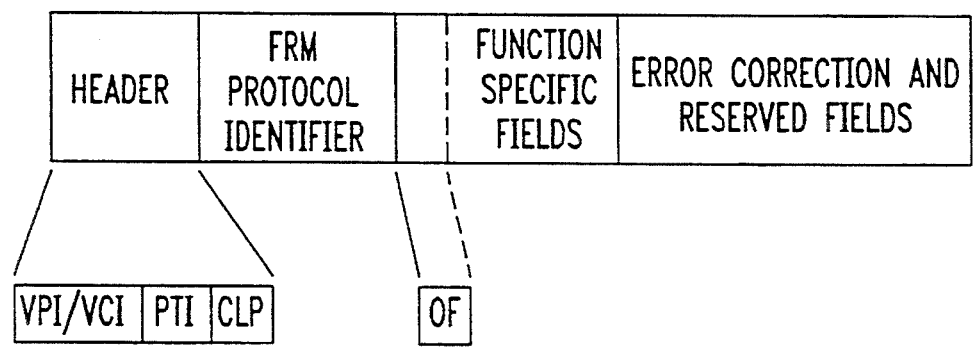
FIG. 3 is an illustrative example of a so-called "scout cell" that is transmitted by the port circuit of FIG. 2 to determine if congestion exits along the route of a connection.

Turning then to FIG. 3, it is seen that a scout cell comprises a standard number of ATM size octets, namely 53 octets, in which the octets are partitioned to comply with a proposed standard for a so-called Fast Resource Management (FRM) cell. An FRM cell, more particularly, is characterized by a header, FRM protocol identifier, function specific fields and error check fields. The header includes Virtual Path (VP) and Virtual Circuit (VC) identifiers, which identify the associated virtual connection; Payload Type Indicator (PTI), which equals a value of six to identify an FRM cell; and Cell Loss Priority (CLP), which, when equal to a value of one is accorded low cell loss priority. The values of the FRM protocol identifier and CLP fields for a scout cell are 04 and 1 (one), respectively. The first octet of the function specific fields has a value of 0F (F0) when the cell is traveling in the forward (reverse) direction of the associated virtual connection. Thus, when controller 106-1 supplies a scout cell to switch fabric 107 for transmission over link 26-2 of virtual connection 26 extending in the; forward direction to node 110 (FIG. 1), the contents of the first octet of the function specific field equals 0F.

Returning to FIG. 1, node 110, responsive to receipt of a scout cell via link 26-2 forwards the cell to node 115 only if output port 111 of node 110 serving the forward direction of link 26-3 is not congested, i.e., the number of cells queued at that port is below a predetermined threshold. If such congestion exists, then node 110 discards the scout cell. Otherwise, node 110 forwards the cell to node 115. Assuming that is the case, then port 111 forwards the cell to port 117 of node 115 via link 26-3. (It is noted that link 26-3 is shown as a dashed line to indicate the possibility that one or more intervening ATM switches, or nodes, may be disposed between ports 111 and 117.) Port 117, responsive to receipt of the scout cell, forwards the cell to destination port 116 via the switch fabric (not shown) of node 115. Assuming that traffic congestion is not present at port 116, then, upon receipt of the scout cell, port 116 changes the first byte of the function specific field from 0F to F0 to characterize the transmission direction of the scout cell from forward to reverse. Port 116 then injects the scout cell in the traffic that is being transported over virtual connection 26, but in the opposite direction, i.e., from node 115 toward node 110 and thence to node 105. If, on the other hand, traffic congestion is present at port 116, then port 116 will discard the scout cell upon receipt thereof.

The changing of the aforementioned first byte from 0F to F0 changes the way that a node, e.g., 110, processes the scout cell. That is, upon receipt of the changed scout cell, node 110 processes the cell in the same manner as it does user traffic, since the purpose of the cell is to determine the level of congestion in virtual connection 26 from node 105 to node 115 and not from node 115 to node 105. The level of congestion in virtual connection 26 from node 115 to node 105 is determined by port 116. That is, port 116 similarly injects its own scout cells into the virtual connection 26 from port 116 to port 106. The first byte of the function specific field of those cells will contain an 0F, which port 106 will change to F0 upon receipt thereof if there is no congestion at port 106, as will be discussed below. Otherwise, port 106 will discard those cells.

Assume that the scout cell originated by port 106 is not discarded by either node 110 or node 115 and reaches the input of receive processor 106-5, FIG. 2, via switch fabric 107. Receive processor 106-5, responsive to receipt of a scout cell, stores the cell in an associated register and then checks the VPI/VCI field thereof to determine if the cell originated at port 106. If it did, then processor 106-5 notifies parameter adaptation controller 106-3 of that fact.

The effect of transmitting scout cells to determine whether congestion exists along a particular virtual connection and the return of those cells to the originating port is illustrated in FIG. 3, in which each "up" arrow represents a scout cell that a port, e.g., port 106, injects into the forward direction of a virtual connection, e.g., 26. Each "down" arrow represents the receipt of a scout cell that the port priorly transmitted over the virtual connection. In an illustrative embodiment of the invention, a port, e.g., port 106, originates a scout cell during each period T for each virtual connection, e.g., 26, that the port is serving. In an illustrative embodiment of the invention, T may be a period of time that is some multiple, e.g., 30, of 11.378 milliseconds.

With respect to FIG. 3, assume that R0 is the minimum admission rate of traffic (average or peak) negotiated for a particular virtual connection, e.g., 26 and that Rmax is the allowable maximum admission rate that can be attained for the associated connection. Also assume that the data source, e.g., source 25, begins transmitting dam over connection 26 at the start of period T and does so at the negotiated rate R0. At the end of each period T, or interval T, port 106 injects a scout cell into the flow of traffic that is being forwarded to port 116 via connection 26 and continues to do so as long as source 25 transmits at least one data cell during each such interval.

Assume that as a result of various delays, e.g., normal propagation and other "round trip" transmission delays, port 106 receives the first of the priorly transmitted scout cells during the fourth interval. As mentioned above, receipt of a priorly transmitted scout cell is interpreted as an indication that the forward leg of a virtual connection may not be congested. The absence of a scout cell is interpreted otherwise. Port 106, more particularly, checks at the end of each such interval to see if a scout cell had been received during the interval. If not, as is the case for intervals 0 through 3, then adaptation controller 106-3 (FIG. 2) operating under a particular adaptation algorithm, discussed below, attempts to adapt the admission rate of data that is being received from source 25 and destined for connection 26. However, because of the aforementioned negotiation, controller 106-3 cannot reduce the admission rate below R0.

The adaptation algorithm that controller 106-3 implements relates the allowed admission rate for a next interval with the admission rate allowed during the previous interval as shown by the following:

$$Rn = Rp - [Rp - R0] * D + G * F \quad (1)$$

where Rn is the allowed admission rate for the next interval and is constrained to $R0 \leq Rn \leq Rmax$; Rp is the admission rate allowed during the previous interval; D is a so-called damping factor and is a constant for a particular channel, or virtual connection; G is a gain factor and is constant for the latter channel and F is an adaptation factor. In an illustrative embodiment of the invention, $0 \leq D \leq 0.25$; $(1/64)R0 \leq G \leq 8R0$; and $F = -1$ if no scout cell was received during the previous interval, otherwise, $F = 1$ (2) if one (more than one) scout cell was received during the previous interval.

It is seen from FIG. 3 that once port 106 begins receiving the scout cells that it transmitted over connection 26, then adaptation controller 106-3 begins increasing Rn for connection 26. For example, as a result of receiving a scout cell during each of the intervals 4 through 6, controller 106-3 increased the value of Rn accordingly, as represented by steps a, b and c. Note, however, that as a result of not receiving a scout cell during intervals 7 and 8, adaptation controller 106-3, operating in accord with the algorithm described above, decreases Rn, as represented at e and f. Such decreases occur as a result of variable F being set to −1 for each of the latter intervals. It is next seen that: port 106 receives a scout cell during each of the intervals 9 though 14, but does not receive a scout cell for interval 15. Accordingly, adaptation controller 106-3 increases Rn incrementally at the end of each of the intervals 9 through 14 but decrease Rn by an incremental rate at the end of interval 15.

Assume at this point that source 25 ends its transmission of data cells during interval 12. As mentioned above, if port 106 receives a cell from source 25 during an interval, then port 106 transmits (injects) a scout cell at the end of the interval. Thus, port 106 transmits a scout cell at the end of interval 12, but not at the end of the succeeding intervals, e.g., interval 13. However, as a result of propagation delays, adaptation controller 106-3 will continue to receive scout cells that it launched previously and responds thereto even though source 25 ended its transmission of data cells. A:s such, controller 106-3 responds to the receipt of its own scout cells during each of the intervals 13 and 14 by increasing Rn, as represented in the Figure at g and h. Similarly, controller 106-3 responds to the absence of a scout cell during interval 15 by decreasing Rn, as shown at j. It is assumed that, because of propagation delays and/or other reasons, two scout cells are received during interval 16. As a result thereof, controller 106-3 sets the value F to 2 when it runs the adaptation algorithm at the end of interval 16. Accordingly, the incremental increase in Rn is doubled, as shown at k. The latter increase causes Rn to equal Rmax, the maximum value for Rn. Thereafter, and as a result of port 106 ending its transmission of scout cells over connection 26, the receipt of scout cells ends during interval 16. Adaptation controller 106-3 responds to the absence of scout cell during each of the succeeding intervals by decreasing Rn by an incremental amount, and continues to do so until the value of Rn reaches a minimum value, R0, as represented at 1.

Returning to FIG. 2, receive controller 106-5 notifies adaptation controller 106-3 each time a scout cell originated by port 106 is received via switch fabric 107, as mentioned above. However, if receive controller 106-5 finds that the received scout cell was originated by some other port, such as port 116 that is at the opposite end of connection :26, then controller 106-5 checks the level of congestion at FIFO 106-6. If FIFO 106-6 is congested, then receive controller 106-5 discards the scout cell. If the FIFO is not congested, then receive controller 106-5 changes the first byte of the associated function specific fields from 0F to F0 and supplies the changed cell to injection circuit 106-2. The latter circuit, in turn, injects the scout cell into the flow of data traffic that controller 106-1 is supplying to switch fabric 107. Receive controller 106-5 similarly processes scout cells associated with other virtual connections established between port 116 and other ports, respectively.

If receive controller 106-5 is associated with an intervening port in a virtual connection, such as port 112 (FIG. 1), then controller 106-5 processes scout cells traversing the reverse path of their respective virtual connections as though such cells were user cells.

As discussed above, adaptation controller 106-3 increases or decreases the value of Rn for virtual connection 26 (and/or each other active virtual connection) based on whether a scout cell was received during an interval. Adaptation controller 106-3 increases or decreases Rn by updating the parameters that are used in the aforementioned leaky bucket algorithm that controls the admission rate of data cells supplied by source 25. In order for source 25 to respond to an increase or decrease in the admission rate of the data that it is supplying to port 106, then source 25 needs to be notified thereof. In accord with an aspect of the invention, port 106 may periodically transmit a "backward congestion notification" cell having a format similar to a scout cell (FIG. 3) to source 25 via path 26-1. Source 25 responsive to receipt of a notification cell decreases the rate that it is supplying data cells to network 200. For example, if source 25 transmits data cells in accord with a window-based transmission protocol, then it may reduce the rate at which it is transmitting data by reducing the size of the transmission window by a predetermined increment. If, on the other hand, source 25 does not receive a notification cell within a predefined interval, then source 25 assumes, that it may increase its transmission rate of data cells. Similarly, source 25 may do so by increasing the size of the transmission window by a predetermined increment.

Figure 4:
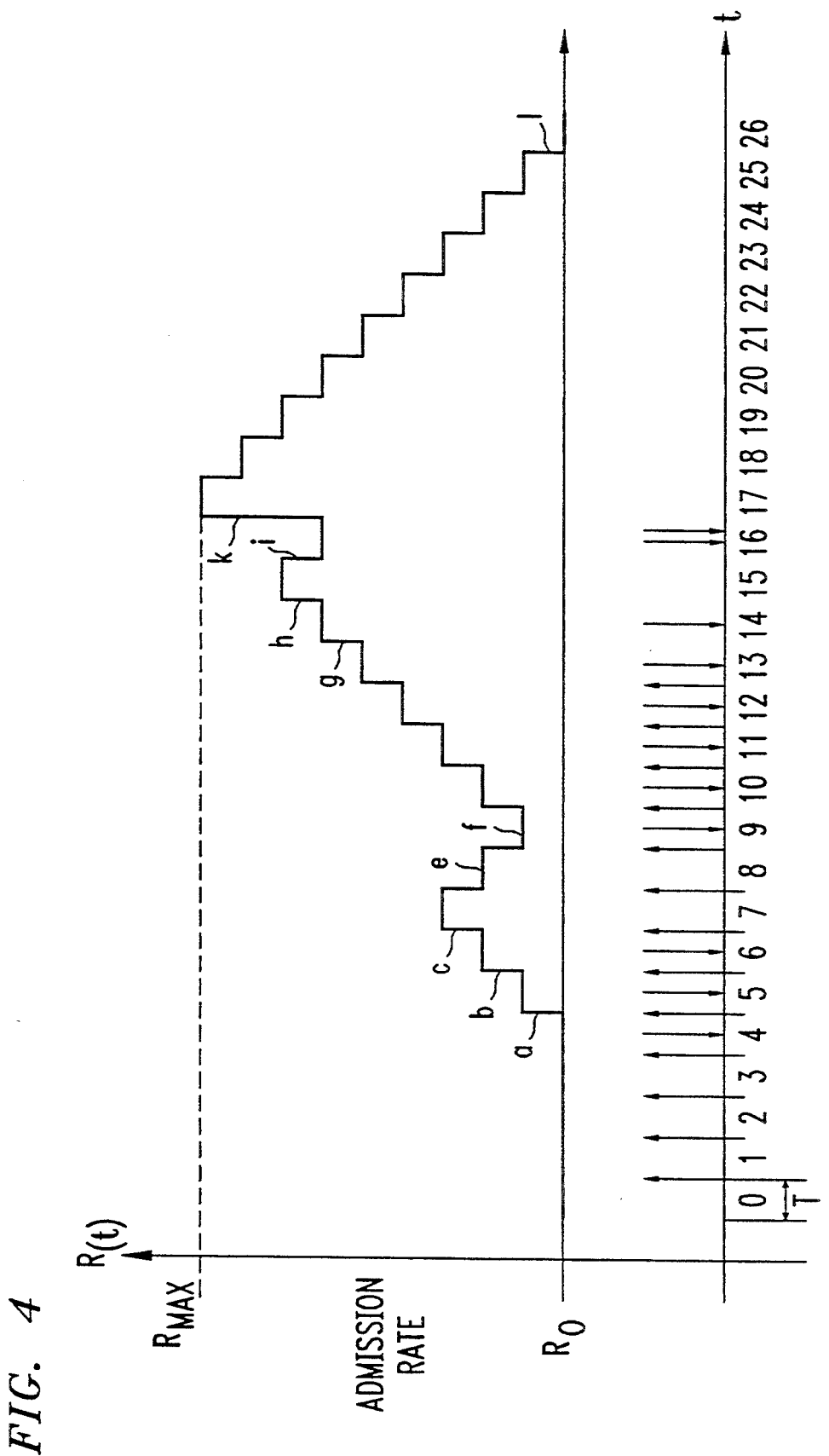
FIG. 4 illustrates the way in which the admission rate of data into the network is adapted as a function of such congestion.

A notification cell may also be sent to source 25 whenever the rate at which source 25 is transmitting cells is close to violating the current values of the associated traffic (policing) parameters, e.g., Rn and cell delay variation tolerance ($\tau$). A notification cell may also be sent to source 25 when, during one of the aforementioned intervals (T, FIG. 4), a scout cell generated by port 106 is not returned as a result of congestion occurring along the route of the associated virtual connection.

The foregoing is merely illustrative of the principles of the invention. Those skilled in the art will be able to devise numerous arrangements, which, although not explicitly shown or described herein, nevertheless embody those principles that are within the spirit and scope of the invention. For example, the foregoing may be arranged so that a port circuit does discard a scout cell, but changes the cell to a low priority cell and returns the cell to the originator. As another example, two different leaky bucket algorithms may be used— one for policing an average transmission rate and one for policing a peak transmission rate. As a further example, an ATM switch may be arranged so that the switch fabric may discard a scout cell if the level of traffic being queued by the fabric meets or exceeds a predetermined threshold.

We claim:

1. A method of determining a level of traffic congestion along a route of a communications connection, said connection extending from an origination port to a destination port, said method comprising the steps of at said origination port, transmitting a scout message containing a first identifier over said communications connection, and responding to receipt of said scout message at said destination port, by changing said first identifier to a second identifier if traffic congestion is not present at said destination port and returning said scout message containing said second identifier to said origination port via said connection, otherwise, discarding said scout message if traffic congestion is present at said destination port.

2. The method set forth in claim 1 wherein said origination port operates to receive data messages from a source of data at a particular data rate and to forward said data messages over said connection to said destination port, and wherein said step of transmitting includes the step of responding to receipt of said returned scout message by allowing said source to increase said data rate.

3. The method set forth in claim 2 wherein said data rate is allowed to increase each time said scout message containing said second identifier is received until said data rate reaches a maximum value.

4. The method set forth in claim 2 wherein said step of transmitting includes the step of decreasing said data rate in the event that said scout message containing said second identifier is not received prior to transmitting a next scout message containing said first identifier.

5. The method set forth in claim 4 wherein said step of decreasing includes the step of notifying said source of data to decrease its rate of transmitting data.

6. The method set forth in claim 5 wherein said step of notifying includes the step of sending a feedback cell to said source of data, in which the contents of said feedback cell is indicative of the presence of traffic congestion along the route of said communications connection.

7. The method set forth in claim 5 wherein said data rate is based on a predetermined adaptation procedure which periodically changes said data rate incrementally responsive to the presence or absence of traffic congestion along the route of said communications connection, in which said change is determined as a function of a data rate, R0, negotiated with said source, a current data rate, Rp, and a plurality of predetermined factors, and wherein said step of notifying includes the step of sending a notification message to said source whenever said origination port is receiving data from said source at a rate which is close to a current data rate derived in accord with said adaptation procedure.

8. The method set forth in claim 1 wherein said communications connection is a virtual connection established over an asynchronous transport mode network and wherein said scout message containing either said first identifier or said second identifier is a fast-resource-management data cell.

9. The method set forth in claim 1 wherein said first identifier has a value of 0F and said second identifier has a value of F0.

10. A method of controlling an increase in the admission rate of data packets being received from a source of data, said increase being based on whether a communications connection over which said data packets are being transmitted can accept said increase, said method comprising the steps of periodically transmitting a particular type of message containing a first identifier over said connection extending from an originating port serving said source to a destination port, and thereafter responsive to receiving said message from said destination, in which said destination port changed said first identifier to a second identifier to signify such acceptance, allowing said admission rate to increase and wherein said method further comprises the step of decreasing said admission rate in the event that said scout message containing said second identifier is not received prior to transmitting a next message containing said first identifier.

11. The method set forth in claim 10 wherein said admission rate is increased upon receipt of each said message containing said second identifier until said admission rate reaches a maximum value.

12. The method set forth in claim 10 wherein said step of decreasing includes the step of notifying said source of data to decrease its rate of transmitting data.

13. The method set forth in claim 12 wherein said step of notifying includes the step of sending a feedback cell to said source of data, in which the contents of said feedback cell is indicative of the presence of traffic congestion along said communications connection.

14. The method set forth in claim 13 wherein said admission rate is based on a predetermined adaptation procedure which periodically changes said admission rate incrementally responsive to a presence or absence of traffic congestion of said communications connection, in which said change is determined as a function of an admission rate, R0, negotiated with said source, a current admission rate, Rp, and a plurality of predetermined factors, and wherein said step of notifying includes the step of sending a notification message to said source whenever an origination point of said connection is receiving data from said source at a rate which is close to a current admission rate derived in accord with said adaptation procedure.

15. The method set forth in claim 10, wherein said decrease in the transmission rate of data substantially equals the decrease in said admission rate.

16. In a connection established between an originating port and a terminating port for the purpose of forwarding data messages from said originating port to said terminating port, a method of notifying said originating port that a particular level of traffic congestion exists at said terminating port, said method at said terminating port comprising the steps of receiving via said connection a scout message containing at least a first identifier indicative of a request requesting the level of traffic congestion at said terminating port, and responding to receipt of said scout message by either (a) changing said first identifier in said scout message to a second identifier and transmitting said scout message containing said second identifier to said originating port over said connection if said level of traffic congestion is less than a predetermined threshold, or (b) discarding said received scout message if said level of traffic congestion at least equals said predetermined threshold.

17. The method set forth in claim 16 further comprising the step of, at said origination port, generating said scout message containing said first identifier and forwarding said scout message over said connection to said terminating port.

18. The method set forth in claim 16 wherein said connection is initially associated with a bandwidth of, Rp, and wherein said method further comprises the step of at said originating port, responding to receipt of said scout message containing said second identifier via said connection by allowing a source of data associated with said connection to increase said bandwidth from Rp to a new bandwidth, Rn.

19. The method set forth in claim 18 wherein said bandwidth is allowed to increase each time said scout message containing said second identifier is received until said data rate reaches a maximum value.

20. The method set forth in claim 16 wherein said originating port receives said data messages from a source of data messages and wherein said method further comprises the step of sending to said source of data a message indicating that said bandwidth may be increased.

21. The method set forth in claim 16 wherein said step of responding includes the step of decreasing said bandwidth in the event that said scout message containing said second identifier is not received prior to transmitting a next scout message containing said first identifier.

22. A method of determining a level of traffic congestion along a route of a communications connection extending from a first port to a second port, said communications connection including one or more intervening ports, said method comprising the steps of at said first port, forming a scout message containing a first identifier and transmitting said scout message over said connection, at each of said intervening ports, responding to receipt of said scout message containing said first identifier either by transmitting said scout message via said connection to a next, succeeding port or discarding said scout message if traffic congestion is respectively not present or is present thereat, and at said second port, responding to receipt of said scout message either by changing said first identifier in said scout message to a second identifier and returning said scout message containing said second identifier to said first port via a return path of said connection if traffic congestion is not present at said second port, otherwise, discarding said scout message if traffic congestion is present at said second port.

* * * * *